July 22, 1924.
J. N. A. SAUER
1,502,592
PROCESS FOR PREPARING DECOLORIZING CARBON
Filed March 26, 1923
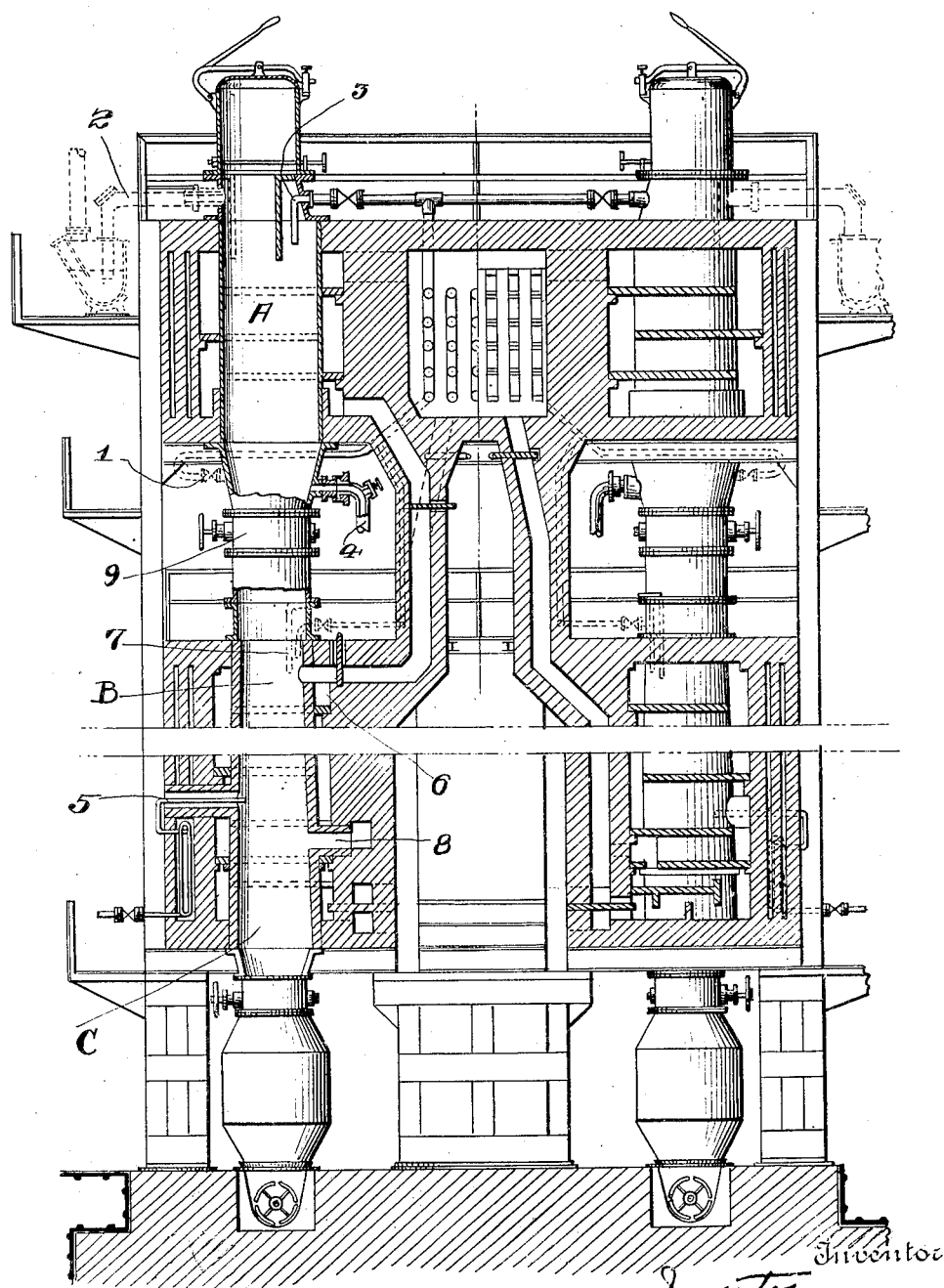

Patented July 22, 1924.

1,502,592

UNITED STATES PATENT OFFICE.

JOHAN NICOLAAS ADOLF SAUER, OF AMSTERDAM, NETHERLANDS.

PROCESS FOR PREPARING DECOLORIZING CARBON.

Application filed March 26, 1923. Serial No. 627,757.

*To all whom it may concern:*

Be it known that I, JOHAN NICOLAAS ADOLF SAUER, residing at 43 Johannes Verhulststr., Amsterdam, Netherlands, have invented certain new and useful Improvements in and Relating to a Process for Preparing Decolorizing Carbon, of which the following is a specification.

The invention relates to the production of decolorizing carbon from carbonaceous material by the application of heat and the action of an active gas or gas mixture, for example steam, carbon dioxide, producer gas or carbonmonoxide and air, chlorine and the like on the glowing material.

For the purposes of this specification setting forth the invention I shall define adsorptive carbon or active or decolorizing carbon or activated carbon as a porous carbon preparation having, e. g., in regard to coloured raw sugar solutions, a higher adsorption capacity for most of the colouring matter therein contained than ordinary bonechar or having a higher adsorption capacity (capillary, specific or otherwise) for most gases than ordinary charcoal, or having both these properties organic substances of vegetable, animal or carbonaceous mineral origin may be used as raw material for the production of decolorizing carbon or substances containing a substantial amount of organic matter of either vegetable, animal or mineral origin.

The yield in active decolorizing carbon when peat and similar substances are used as the raw material may amount depending on the quality of the final product, the manner of operation or the size of the pieces of the raw material or on two or more of these factors to about 10%; while when starting with wood charcoal, the yield may amount to about 25%.

I have found that in the production of decolorizing carbon the above mentioned object can best be attained by first removing the gases from the carbonaceous material, such as wood or wood waste, peat or peat waste, cellulose, browncoal, lignite, ground and briquetted pitcoal, or some product which by preliminary dry distillation is obtained from these materials. Such removal should be as complete as possible, which can be effected most advantageously by a simple process of heating, a moving current of such material while subjecting it to a counter current of gases which are formed in the region of activation to be described later on, or by subjecting it to a current of gases which in actual practice have little or no attacking effect on the glowing material, but on the other hand serve to sweep out or to wash out the products of distillation and remove them quickly from the material. Such latter gases can be neutral or slightly oxidizing. Owing to this treatment, the tars and oils formed are prevented from being condensed on the carbonaceous material, (and being cracked in contact therewith) so that they have no detrimental action on the quality of the carbon.

Through the gradual heating of the raw material at this stage to the best temperature for the purpose, such as, for example 1000° C. the fixed oxygen and hydrogen and possibly nitrogen or similar elements, are driven off in the most complete manner possible in the form of gaseous products, as is shown to be requisite for an economical process for the production of decolorizing carbon.

There thus remains in the carbonaceous material only so much of these elements as corresponds to the temperature selected. This residue as a general rule becomes smaller as the temperature selected is higher.

During this step the temperature of the carbon or charcoal mass should not be too high, since above 1300° centigrade a prejudicial action may occur, and the carbon may lose in decolorizing power.

This splitting off is rendered easier through the scavenging action of the above mentioned gases and in this way the loss of carbonaceous material is reduced to a minimum.

By this means it is possible to obtain a material rich in carbon, which does not however yet possess strongly active qualities.

The method of moving the charge in the opposite direction to the stream of gases is considerably more effective and more economical, simpler and safer, than those methods in which the current of gas moves in the same direction as the charge, because in the latter case, the products of distillation which are split off are driven further into the heated mass of carbon, and are condensed. This gives rise to decomposition, which acts prejudicially upon the final product.

The counter current treatment removes these reaction products quite thoroughly. The hydrogen and oxygen contents are more completely removed and hence a product richer in carbon is produced. Such product can be made to acquire (by subsequent chemical treatment) a far greater decolorizing activity, than that produced by the concurrent heat-treatment.

This chemical activation may take place with the aid of solid materials, for example, materials added at the start to the raw material, such as $CaCO_3$, $MgCO_3$, $Ca(OH)_2$ or $CaO$, $CaCL_2$, $MgCl_2$, or other carbonates or chlorides or mixture thereof, or by the employment of liquids or active gases or liquids converted into gaseous form, or by combination of such agents. By the use of $CaCO_3$, $CO_2$ is split off at about 900–1000° C., and thus begins to react in the hydrogen present.

It is possible further to assist the scavenging process, by the employment of mainly inert gases or by a combined method in which active gas is used in addition to inert gas.

It has further been found that by passing through active gases at this stage the temperature may be lower than the maximum temperature in the first stage, and that the gases should preferably act upon the mass of carbon with a gradual increase in the temperature with the object inter alia, of preventing too much carbon from being attacked and the yield of carbonization being diminished.

By varying the nature, quantity and temperature of the active gas, it is possible to render the thermal effect of the chemical action more or less negative, or even positive, as occasion may require, and in this manner, if need be through the control of the external heating, the temperature in the different zones may be regulated at will.

The two operations, namely—the preliminary carbonization with scavenging by a current of gas flowing in the opposite direction and the activation (if desired, in combination with added substances which accelerate the activation,) may, when the process is carried out, be combined in such a manner that the reaction gases in the zone of activation may be conveyed into the zone of preliminary carbonization, while the combustible gases, which escape from the preliminary carbonization chamber or are sucked out therefrom, may be employed for the purpose of heating the material.

In carrying out the process it is of advantage to make use of a simple or combined vertical or inclined retort, generally speaking a retort of the kind in which the material is chiefly kept in motion through the action of gravity, although in certain circumstances also horizontal, e. g., rotary retorts can be used with success.

When a horizontal retort provided with conveying means or a rotary inclined retort is used, the raw material may be introduced in a more or less fine granular form.

When a vertical or inclined retort is used, the raw material, preferably in the form of more or less large lumps, is put in at the upper end, and active gas (preferably at a comparatively low temperature, such as 300–6000° C.), such as steam, carbonic acid, chlorine or carbon monoxide together with a gas containing oxygen, such as air, or mixtures of these gases, is introduced at a point in the neighbourhood of the lower end of the retort. In this manner a heat exchange may occur in which the mass is cooled whereas the introduced gas is heated.

All such gases as well as gaseous products of combustion, if necessary mixed with steam or air or both steam and air, may be employed. Likewise, in order to obtain a more intensive heating, producer gas with air may be introduced, or a mixture of reducing and oxidizing gases or retort gases which either have or have not been previously purified.

When using combustion within the retort, or when using combustion gases, an external heating may be dispensed with or a combined external heating and a heating within the retort, may be applied.

In this manner the process is so controlled that the temperature in the retort rises to a maximum in the downward direction and then decreases again. Under circumstances it may be of advantage to create a final zone in which the temperature is raised, e. g., to 1200° C. In this stage a further activation may occur.

The material to be carbonized or further carbonized is when applying a vertical retort admitted at the upper end, from which it gradually moves in a downward direction, while the decolorizing carbon is removed at the lower end, either continuously or at certain intervals, and after cooling and after grinding if such be necessary, is ready for use. In case of need this carbon can be further purified by treatment with hydrochloric acid or alkali solution or both, or by other chemicals.

This invention may be carried into effect by introducing active gases, for example chlorine, or volatile chlorides, air, steam, carbon dioxide, or carbon monoxide, flue or generator gases or two or more of the gases mixed (or a mixture of like or substantially like gases) with or without air or oxygen, at or near the bottom or discharge end of the retort, at a temperature which may for active gases, which cause endothermic reactions (steam, carbon dioxide, etc.) be lower than the mean temperature in that zone of the retort in which reaction of these active gases with the incandescent material takes place. Such gases introduced in or near the bottom of the retort may be used to cool down the material at the lower end of the retort which has already been converted into highly active decolorizing carbon. The temperature of the said gases is thereby gradually increased. At a certain temperature inside the retort, between 700° C. and 900° C. and probably at 800° C. to 850° C., superheated steam acts on the noncarbonaceous matter in the nearly final carbonized and already partly activated material so as to convert it in an active product. The result is that working between 700 and 900° C. without too great a loss of solid carbon, the carbon compounds are destroyed and driven off, and a highly active porous decolorizing carbon substantially free from hydro-carbon, oxygen, nitrogen, sulphur, etc., is obtained. When air is used for activation the temperature at which activation takes place and by which the greatest yield is obtained, lies between 400 and 600° C. and if carbon dioxide is used for activation, the activation temperature lies between 900 and 1200° C. The temperature of 400 to 600° C. for air does not however give the greatest activation. If the active gases are made to act at a very high temperature (higher than required for their action) on the incandescent carbonaceous material, also heated to a higher temperature, the result is that the carbon is attacked at the same time as its compounds, and carbon (already highly activated) is thereby consumed and this results in a product which is not so active in absorbing power, while the yield is very much less than with the procedure here indicated.

By regulating the amount of active gases introduced somewhere near the bottom or discharge end of the retort, or by using a suitable empirically determined length of retort with a given quantity of active gas introduced at the lower end of the retort and at a particular temperature, the reaction of said gases can be limited to a certain zone of the retort, and the cooling of the material in the retort, due to the endothermic reactions caused by the active gases, such as steam (superheated) or carbon dioxide, is accordingly limited to said zone. Above this zone there is then a zone where the highest temperature in the retort is attained. When superheated steam is used in the lower end of the retort, at a temperature between 700 and 900° C., carbon dioxide is also formed by the action of the steam on the incandescent carbonaceous material and this carbon dioxide will then act at a higher point in the retort where a higher temperature of the incandescent material exists, so that a double activation takes place.

In accordance with the processes hitherto carried out for the production of decolorizing carbon through the action of heat and gases, heated steam was conveyed into horizontal or slightly inclined retorts through the mass to be carbonized, by means of a perforated tube, which was arranged at the bottom of the said retort, or the steam was admitted at the upper end of a vertical retort to the mass, and the retort gases were drawn off at the lower end of the retort.

The external heating of the retort was effected from below upwards, so that the temperature of the material in the retort, in practice, gradually increased downwards.

An apparatus suitable for use in the process is shown in vertical section, in the annexed drawing. A designates the preliminary distillation zone for treating the uncarbonized or partially carbonized material. In this zone porous charcoal is made. If I start from material giving off large quantities of condensable products, gases, preferably superheated are introduced at 1 and drawn off at 2. If the material used is already partially pre-distilled, such as common charcoal, the distillation may be continued in the retort A and in this case the passing of gas may also be effected from above downwards. In the latter case the scavenging gas may be introduced at 3 and drawn off at 4. The conditions in this retort are chosen in such a manner that practically no action of the gases on the incandescent material takes place. If e. g., steam is used for scavenging this zone, the material should be pre-distilled at temperatures below that at which activation takes place. In the case of using reduced gases such as CO or mixtures of different gases, the pre-distillation may be carried out at much higher temperatures and it is a special feature in the present invention that the pre-distillation is carried out at temperatures above the ordinary distillation temperature.

B is the activation retort or the activation zone of the retort. In this part of the retort the activating gases are introduced; that is to say gases which have an activating effect on glowing charcoal or the like. If superheated steam is introduced at 5, the reaction products may be sucked away at 6 or if steam, carbon dioxide, chloride or other activating gases are introduced, at 7, the reaction products may be drawn off at 8. If required, the active carbon may be finally burned at the lowest part of the retort (C), i. e., it is heated at temperatures about equal to the temperature of the activation zone and either no gases are passed at all through this part, or such gases which have no activating action.

As to the use of a rotary kiln, I may refer to ordinary cement kilns, but the construction must be such that free entrance of air is excluded, as otherwise explosions would occur.

I can do away with the gates at 9 and the retort may be built as a single, vertical, continuously working kiln.

In the appended claims, the term "substances" is used in its generic sense, including solids, liquids, and gases.

This present process has many disadvantages, namely:

1. The products of dry distillation are conveyed through the zone containing the glowing mass, the greater portion has already been degasified, so that it becomes deteriorated in quality owing, inter alia, to the decomposition of the products of distillation, the separation of the inactive carbon causing the pores to become clogged and rendering it necessary for the material to be finally burned off later on.

2. When issuing at the lower end of the retort a portion of the carbon of the best quality is carried along with the gas.

3. If the raw material used is one that gives rise to the formation of a considerable amount of tar products, such as wood or peat, a choking and a coking of the material takes place.

4. The effective action of the gas is partially lost in consequence of contamination by the products of distillation.

5. Difficulties may be experienced in the working of the closing devices.

6. There is a considerable risk of oxidation of the glowing mass of the finished decolorizing carbon.

7. The active gas becomes partially inoperative at the point where its activating effect ought principally to be exercised.

8. No preliminary drying takes place by means of gases admitted in a contrary direction, as is the case with the process forming the subject of the present application.

According to the present invention it is possible to select the temperatures in the various zones in accordance with the nature and quality of the raw material, the nature of the active gas or the chemicals added, etc.; it is not possible to lay down a generally fixed rule.

The process possesses great advantages if material is employed such as wood, peat, browncoal, lignite, ground and subsequently briquetted pitcoal, and the like, which contain a large quantity of dry distillation products.

The commercial production of decolorizing carbon is a comparatively new process, and a thorough knowledge of the factors which act favourably and adversely in the preparation has not up to the present been had.

The following remarks may serve to enable a proper understanding of the various methods, about which literature exists or which have become known by other means, and which have found actual employment in practice, and to exhibit clearly how researches have been and continue to be made at various places, with the object of discovering a process for the economical production of a good decolorizing carbon possessing a high co-efficient of adsorption.

Waste sulphite liquor from paper factories is evaporated to dryness, then carbonized by means of heat and the carbonized mass is leached out with water or with acids, e. g., hydrochloric acid, and finally washed out with water. The carbon obtained in this manner has a more or less good co-efficient of adsorption according to the manner in which it has been heated and according to its subsequent treatment.

The carbon is however extremely finely subdivided and is not easily retained by filtration, through a cloth for example, (especially at the beginning of the filtration). It is also of little value as a material for assisting filtration. This carbon cannot be regenerated by reburning.

According to the zinc chloride process, cellulose or material containing cellulose is dissolved in a concentrated solution of zinc chloride, the mass is steamed dry and heated up if required to a temperature at which the zinc chloride becomes volatilized, and occasionally even higher; the carbonized mass is leached out with acid and further washed out.

If the heating has been sufficient this charcoal is usually of good quality and possesses a high coefficient of adsorption. The product is however very fine, exhibits no structure, does not admit of easy filtering and is likewise of poor value as a means of assisting filtration. The carbon cannot practically be regenerated either by heat or chemicals.

An alternative method in the employment of zinc chloride or other chlorides or a mixture of various chlorides is to saturate therewith the mass to be carbonized without the mass at the same time being dissolved in the zinc chloride. The subsequent treatment is the same as described above.

The carbon which is obtained in this manner is less good in quality though it usually exhibits to a certain degree the structure of the raw material (cellular plant fibre) and permits of being filtered off and can be retained through cloth for example if not ground too finely.

This carbon is however also of inferior value as material for assisting filtration, because the co-efficient of adsorption is not so high, and thus colloidal substances (gums, pectins, etc.) are not properly adsorbed.

If strong sulphuric acid is used in the production the process is approximately the same as that indicated for zinc chloride, and so far as the charcoal obtained is concerned it possesses the same disadvantages as in the case of the chloride methods.

Another method has been to employ seaweed as the raw material for the production of decolorization carbon. The seaweed is dried, carbonized, potash obtained by leaching out, and the remaining mass of charcoal is then rendered incandescent in horizontal retorts, in such manner that the material is conducted mechanically through the retort. The resultant carbon is if necessary leached out with acid and washed out with water.

The product obtained is likewise extremely fine, without structure and forms a poor material for assisting filtration. Rice husks have been used in the production of decolorizing carbon. The rice husks are carbonized, and the carbonized mass, which contains about 80% of silica, is treated with strong soda lye, whereby water glass is obtained, while the leached out charcoal is further treated with acid and washed with water. With respect to this charcoal the same remarks may be made as for that named above.

A variation of this process consists in collecting the ashes of the rice husks, which latter are used in heating boilers in rice decorticating mills; this ash contains particles of still unconsumed carbon, and is treated in the manner indicated above.

For the production of decolorizing carbon it has already been proposed to employ as raw material brown-coal or lignite, sawdust, pine needles, peat, wood and other vegetable material. Several processes are known or suggested, according to which the colorizing carbon is obtained by mixing the substances mentioned with mineral substances such as dolomite, calcium chloride, calcium carbonate, calcium hydroxide, magnesium chloride, or with organic substances such as potato starch, proteids, blood, etc., which are added in varying quantities.

Usually the addition of mineral constituents is very large, and varies from 30 to 100% of the vegetable raw material, while the addition of organic substances is mostly smaller.

The vegetable raw material and the mineral or other substances to be added are usually ground fine and well mixed, and then worked into a paste either dry or with water, after which they are subjected to dry distillation. The carbon obtained in this manner is drawn together by means of acid and washed with water. The carbon thus produced is also generally very fine, is not easily filtered and is of inferior value as a material for assisting filtration.

The cost of leaching out the mineral constituents which have been added is so high that these processes cannot be carried out in an economical manner.

Although in certain cases the product possesses high co-efficient of adsorption the carbon obtained in the above mentioned manner is mostly of poor quality. The quality of the char from different batches of the same raw material sometimes also varies very considerably.

In the production of yellow prussiate of potash the carbon which is separated is sold as decolorizing powder after having been, if necessary, leached out with acid and washed out with water, or after treatment with other chemicals, lyes, etc. The same remarks apply to this carbon as to the other kinds mentioned.

Wood charcoal which has been employed in the removal of fusel oil from spirit is also employed as the raw material in the production of decolorizing charcoal. The exhausted material, which through incandescence can no longer be restored to a degree of activity suitable to the removal of the fusel oil, is rendered strongly incandescent, ground and sold as decolorization carbon. This carbon is usually leached out with acid and washed with water. As an adsorbent it is generally of poor quality, but continues to exhibit the structure of the wood, and can be retained with comparative ease by filtering material, such as cloth. It is however of small value as a material for assisting filtration owing to its comparatively low co-efficient of adsorption.

Decolorizing carbon has heretofore been obtained from pitcoal. The coal is ground fine and, subjected to a certain pressure at a definite temperature and degree of moisture, is formed into briquettes with or without the use of binding material, and undergoes dry distillation in heated retorts.

The decolorizing carbon obtained is if necessary leached out with acid and washed out with water. In this case also the carbon produced exhibits no structure, although in the process of grinding the mass a certain size of grain can be imparted to the product. The carbon obtained is not of good quality, is difficult to separate, and is not well adapted as a material for assisting filtration.

In connection with peat a further process is known, in which the peat is carbonized in horizontal retorts, by means of which products of dry distillation are obtained which are capable of being condensed, after which the carbonized mass is removed from the retort, washed with acid and subsequently rendered incandescent again in the same or a similar retort. This carbon is of little value and is not adapted as a material for assisting filtration on account of its low co-efficient of adsorption. It can however be retained with comparative ease by filtration as for example through cloth.

In the employment of wood charcoal or other previously carbonized products a familiar process is to carbonize the mass in horizontal, inclined or vertical retorts and to cause steam to be passed through the mass. When vertical retorts are used the passage of the steam has always been from above downwards, while in the case of horizontal retorts the steam is distributed through a perforated tube over the whole length of the retort being driven through the mass during carbonization or at the beginning of the process. All these carbons must be subsequently "burnt" as otherwise the charcoal has no high co-efficiently of absorption.

There is also a process of activating bone-char by the admission of steam passing through the glowing char. In this case also, when vertical retorts are used, the gases, such as steam, are admitted from above downwards (through the more or less coarse-grained bone carbon).

Still further modifications are known for the production of decolorizing carbon, but these are in the main on similar lines to the above mentioned methods of preparation and differ from these only with respect to the temperatures employed, the raw material, the admixture of certain materials, the use of certain gases, the temperature of the gas used, the system of retorts the manner in which the heat is applied, etc.

That what I claim is:

1. A process of producing decolorizing carbon which comprises subjecting solid carbonaceous raw material to destructive distillation and subjecting the heated material while moving as a stream, to the action of a counter current of gases which have not more than a slight oxidizing character, and thereafter subjecting the product of such treatment to the action of activating substances.

2. The process for producing decolorizing carbon from carbonaceous material characterized in that the material is subjected to a preliminary partial dry distillation and to a continued dry distillation while gases which are not more than slightly active are passed through the charge in the direction opposed to its movement, the product then being subjected to the action of activating substances.

3. The process according to claim 2, in which the activating substances used in the activating zone are passed in counter current contact with the charge.

4. The process according to claim 1 in which the activating substances used in the last step are gases and are passed in counter current contact with the charge.

5. The process according to claim 2, characterized in that the gaseous reaction products from the activating zone are passed through the destructive distillation zone.

6. The process according to claim 2, in which the gaseous products from the activating zone are passed at a substantially lower temperature, through the carbonizing zone.

7. The process according to claim 1 characterized in that the counter current of gas mentioned therein is composed of an active gas whose temperature is lower than the mean temperature of the solid material in the activating zone.

8. The process according to claim 1 characterized in that the finished product, before it is removed from the activation step, is cooled down by the gases to be used in such activation step.

9. The process according to claim 1 characterized that the maximum temperature of the solid material in the distillation zone is higher than that of the gases introduced into the activation zone.

10. The process according to claim 1 characterized in that the retort-gases, after having been passed through all the materials, are used for the external heating of the retort.

11. The process according to claim 1 characterized in that the heat required for the dry distillation and further carbonization and for the activation, is obtained exclusively by burning the gases which are produced in the process.

12. The process according to claim 1 characterized in that a substance is used as a raw material which when heated, gives off a large amount of dry distillation products.

13. The process of manufacturing activated or decolorizing carbon from carbonaceous material, in a retort through which said material is passed and in which it is subjected to increasing temperature up to a point in the course of its travel, beyond which point its temperature is reduced by the introduction, at near the discharge end of the retort, of active gases at a temperature lower than the maximum temperature which the charge attains, the said active gases traveling in the opposite direction to the charge and reacting therewith and producing retort gases, which flow towards the mouth of the retort and are removed at near the mouth of the retort.

14. Process according to claim 1 characterized in this, that the activation zone is followed by a zone of higher temperature.

15. The process of manufacturing activated or decolorizing carbon from carbonaceous material in a retort through which said material is passed and in which it is subjected to increasing temperatures up to a point in the course of its travel, beyond which point its temperature is reduced by the introduction at near the discharge end of the retort of active gases at a temperature below that maximum temperature which the charge attains, the said active gases traveling in the opposite direction to the charge and reacting therewith and producing retort gases, which flow towards the mouth of the retort and are removed at near the mouth of the retort.

16. A process according to claim 2, characterized in that the raw material is mixed with solid activating substances and that the activation in the activation zone is assisted by the action of activating gases, introduced into the charge, the gases then being passed to the distillation zone.

In testimony whereof I affix my signature in presence of two witnesses.

JOHAN NICOLAAS ADOLF SAUER.

Witnesses:
   W. H. DUNSTOUR, Jr.,
   H. V. KREYPERT.